United States Patent [19]

Tanaka

[11] 4,276,341
[45] Jun. 30, 1981

[54] WET SUIT MATERIAL AND WET SUIT MADE THEREOF

[75] Inventor: Kazuyoshi Tanaka, Kobe, Japan

[73] Assignee: Kabushiki Kaisha Asahi Gomu, Kobe, Japan

[21] Appl. No.: 87,268

[22] Filed: Oct. 22, 1979

[30] Foreign Application Priority Data

May 2, 1979 [JP] Japan .............................. 54-58304[U]
Jun. 1, 9179 [JP] Japan ................................ 54-68571

[51] Int. Cl.$^3$ .......................... B32B 7/02; B32B 7/12; B32B 5/18
[52] U.S. Cl. ..................................... 428/246; 2/2.1 R; 2/82; 428/252; 428/284; 428/286; 428/287; 428/315; 428/321; 428/424.6
[58] Field of Search .......................... 2/2.1 R, 67, 82; 428/310, 311, 315, 320, 321, 424.6, 424.8, 246, 252, 284, 286, 287

[56] References Cited

U.S. PATENT DOCUMENTS

| | | | |
|---|---|---|---|
| 2,749,551 | 6/1956 | Garbellano | 2/82 |
| 2,981,954 | 5/1961 | Garbellano | 2/2.1 R |
| 3,076,206 | 2/1963 | Shaw et al. | 2/82 |
| 3,446,685 | 5/1969 | Goldstone et al. | 428/310 |
| 3,660,849 | 5/1972 | Jonnes et al. | 428/424.8 |
| 3,674,547 | 7/1972 | Noone | 428/424.6 |

FOREIGN PATENT DOCUMENTS 1265002 3/1972 United Kingdom ..................... 428/310

*Primary Examiner*—William J. Van Balen
*Attorney, Agent, or Firm*—Blanchard, Flynn, Thiel, Boutell & Tanis

[57] ABSTRACT

A wet suit material comprising a synthetic rubber sponge sheet, and a stretch fabric and a polyurethane film which are both bonded to and sandwich the synthetic rubber sponge sheet. The wet suit material of this invention may further comprise a stretch fabric between the synthetic rubber sponge sheet and the polyurethane film. A wet suit made of the wet suit material of the kind described above is excellent in water repellency, stretchability, heat retaining properties, workability, style and so on. A colorful wet suit can also be provided according to this invention.

8 Claims, 3 Drawing Figures

4,276,341

WET SUIT MATERIAL AND WET SUIT MADE THEREOF

TECHNICAL FIELD

This invention relates to a wet suit material and a wet suit made thereof. More particularly, the present invention is concerned with a wet suit material having a composite structure comprising a synthetic rubber sponge sheet, a stretch fabric bonded to the synthetic rubber sponge sheet at one surface thereof and a polyurethane film face material bonded to the synthetic rubber sponge sheet at the other surface thereof and optionally an additional stretch fabric disposed between the synthetic rubber sponge sheet and the polyurethane film face material.

BACKGROUND ART

Conventional wet suits which have heretofore been employed for skin-diving, scuba-diving, surfing, fishing and so on are made of a wet suit material comprising a closed-cell sponge sheet made of a synthetic rubber such as a chloroprene rubber and a stretch fabric, such as a nylon jersey, a nylon tricot and the like, bonded as the backing to the sponge sheet at one surface thereof, the other surface of the sponge sheet being in smooth or embossed form and serving as a face. The sponge sheet is employed because it provides good heat retaining properties and good workability which facilitates the movement of a human body. A chloroprene rubber is usually employed as the material of the rubber sponge sheet because of its good weatherability. A nylon jersey or tricot having good stretchability provides good wearability for the wet suit. The synthetic rubber sponge sheet contains carbon black incorporated therein in order to increase the strength of the sponge sheet. Accordingly, the processed wet suits usually have a black face appearance. The conventional wet suits of the structure as described above have such a weak face skin that they easily get scratches and they are easily torn where subjected to the scratches, sometimes causing fatal damage thereof.

These days, goods for leisure time amusement including wet suits tend to be more and more colorful. For making a colorful wet suit, in general, a pigmented synthetic resin coating film is formed on the back sponge sheet. However, the coating film is inevitably thin because otherwise the stretchability of the wet suit is spoiled. In this case, the color of the pigmented synthetic resin coating film does not appear as it is at the surface of the wet suit, but the mixed color thereof with the black of the sponge sheet appears.

As a means of solving the problem of the weak face skin and of providing a colorful wet suit, a colorful jersey or tricot may further be bonded as the face material to the surface of the sponge sheet opposite to the backing to form a wet suit of sandwich structure. In this case, however, the face material of the jersey or tricot is easily soaked with water, which is then rapidly evaporated when exposed to the atmosphere or wind, causing the cooling of the wet suit and the reduction of the body temperature of a human body wearing the wet suit which are especially notable in sports such as surfing in which the player moves through the air. Furthermore, the wet suit, when soaked with water, becomes heavy by the weight of the water, making the movement of the wearer dull.

It has been found that the above-mentioned drawbacks of the conventional wet suits can be obviated by bonding a polyurethane film to one surface of a synthetic rubber sponge sheet, the other surface of which has a stretch fabric bonded thereto. The present invention has been completed based on this finding.

SUMMARY OF THE INVENTION

It is therefore an object of the present invention to provide a wet suit material which is excellent in water repellency, heat retaining properties, tactile properties and draping, has a tough face, and provides excellent fittingness when it is put in the form of a wet suit on a human body. Another object of the invention is to provide a wet suit made of the wet suit material of the kind described above, which provides excellent workability, a good style and sufficient heat retaining properties when it is put on a human body.

More specifically, in accordance with the present invention, there is provided a wet suit material comprising a synthetic rubber sponge sheet, a stretch fabric and a polyurethane film wherein the stretch fabric is provided on the synthetic rubber sponge sheet at one surface thereof and the polyurethane film is provided on the synthetic rubber sponge sheet at another surface thereof. Optionally, the wet suit material of the present invention may further comprises a stretch fabric disposed between and bonded to the synthetic rubber sponge sheet and the polyurethane film. Further, in accordance with the present invention, there is provided a wet suit made of the wet suit material.

BRIEF DESCRIPTION OF THE DRAWINGS

Other objects and advantages of this invention will become apparent to those skilled in the art upon reference to the accompanying specification, claims and drawings, in which:

PREFERRED EMBODIMENT OF THE INVENTION

Figure 1:
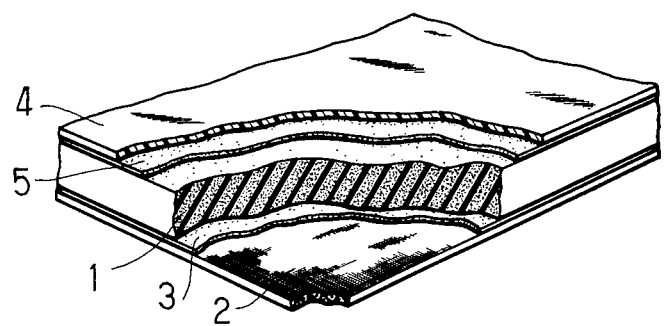
FIG. 1 is a diagrammatic perspective and broken view showing the composite structure of one mode of the wet suit material of the present invention.
Figure 2:
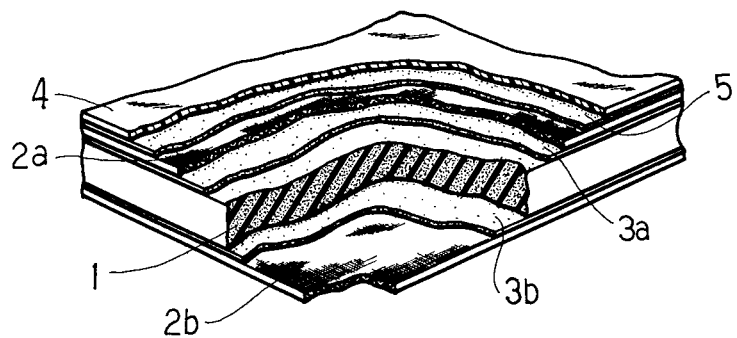
FIG. 2 is a diagrammatic perspective and broken view showing the composite structure of another mode of the wet suit material of the present invention.

Referring now to FIG. 1, one mode of the wet suit material of the present invention comprises a synthetic rubber sponge sheet 1, a stretch fabric 2 bonded as the backing through an adhesive 3 to the synthetic rubber sponge sheet 1 and a polyurethane film 4 bonded as the face material through an adhesive 5 to the synthetic rubber sponge sheet 1. As is shown in FIG. 2, another mode of the wet suit material of the present invention comprises a synthetic rubber sponge sheet 1, stretch fabrics 2a and 2b respectively bonded through adhesives 3a and 3b to the synthetic rubber sponge sheet 1 and a polyurethane film 4 bonded through adhesive 5 to the stretch fabric 2a.

The wet suit material of the present invention has a strong face and a good water repellency as compared with the conventional wet suit materials having as the face and the surface of the sponge sheet in smooth or embossed form or having as the face material a stretch fabric bonded to the sponge sheet. Unlike the wet suit materials having as the face material a stretch fabric bonded to the sponge sheet, the wet suit material of the present invention does not absorb water and, hence, is not subject to the temperature reduction due to latent heat of vaporization of water. Further, the polyurethane film bonded as the face material to the sponge sheet provides very good heat retaining properties for the wet suit material of the present invention. Accordingly, where the wet suit material of the present invention is substantially the same in thickness as the conventional wet suit materials, there can be obtained a wet suit suitable for working in water for a long time. It is also possible to use a sponge sheet up to about 30% as thin as those conventionally used sponge sheets for making a wet suit material having heat retaining properties comparable to those of the conventional wet suits.

The method of the production of the wet suit material of the present invention will be explained by way of example as follows.

EXAMPLE

A synthetic rubber, a reinforcing agent, a softening agent, a foaming agent, a vulcanizing agent and so on are charged into a mixer and mixed to obtain a synthetic rubber sponge composition which is then subjected to aging for at least 24 hours. After aging, the composition is formed into a sheet by using a roll or a extruder, followed by cooling. Subsequently, a predetermined weight of the composition is put into a mold which is then transferred into a pressing machine, and press-molded under heating to obtain a sponge in the form of a sheet which is then sliced to give a synthetic rubber sponge sheet having a desired thickness (about 1.5 mm to about 7.5 mm). The most preferred synthetic rubber is a chloroprene rubber from the viewpoints of excellent weatherability and heat resistance. When a black synthetic rubber sponge sheet is desired, carbon black is used as the reinforcing agent, and, when a white synthetic rubber sponge sheet is desired, active calcium carbonate or mystron vapor (talc) may be used as the reinforcing agent. Naphthene processing oil may be used as the softening agent. DPT (dinitroso pentamethylene tetramine) may be used as the foaming agent. Zinc oxide may be used as the vulcanizing agent. Magnesium oxide may be used as a vulcanization auxiliary agent and diethylene glycol may be used as a surface active agent.

Representative examples of formulations for the production of the synthetic rubber sponge sheet are as follows (all parts are by weight).

| (1) Black Synthetic Rubber Sponge Sheet | | |
| --- | --- | --- |
| Synthetic rubber | chloroprene rubber | 45 parts |
| Vulcanizing agent | zinc oxide | 3 parts |
| Vulcanization auxiliary agent | magnesium oxide | 2 parts |
| Foaming agent | OBSH | 6 parts |
| Reinforcing agent | carbon black | 20 parts |
| Softening agent | naphthene processing oil | 23 parts |
| Surfact active agent | diethylene glycol | 1 part |

| (2) White Synthetic Rubber Sponge Sheet | | |
| --- | --- | --- |
| Synthetic rubber | chloroprene rubber | 45 parts |
| Vulcanizing agent | zinc oxide | 3 parts |
| Vulcanization auxiliary agent | magnesium oxide | 2 parts |
| Foaming agent | DPT | 6 parts |
| Reinforcing agent | active calcium carbonate | 10 parts |
| Reinforcing agent | mystron vapor | 10 parts |
| Softening agent | naphthene processing oil | 20 parts |
| Pigment | titanium dioxide | 3 parts |
| Surface active agent | diethylene glycol | 1 part |

A solution of a polyurethane in an organic solvent such as dimethylformamide, methyl ethyl ketone, toluene or a mixture thereof is applied onto a support such as a release paper and dried to obtain a polyurethane film having a thickness of 0.01 mm to 0.05 mm. Typical example of the stretch fabric to be used in the present invention includes nylon jersey and tricot.

The synthetic rubber sponge sheet as prepared in the manner as described hereinbefore is placed on a first belt conveyor and advanced, and coated with a chloroprene type adhesive from an adhesive-coating roll over the first belt conveyor. The adhesive-coated sponge sheet is transferred onto a second belt conveyor located in front of the first belt conveyor and advanced while evaporating the solvent contained in the chloroprene type adhesive, and covered with a stretch fabric unwound from a roll over the second belt conveyor. The sponge sheet covered with the stretch fabric is advanced through rolls to effect bonding under pressure, and the complete bonding is effected under heat and pressure in a drying machine in which the sponge sheet covered with the stretch fabric is advanced between a heated rolling drum and the second belt conveyor partially surrounding the heated rolling drum. Thereafter, the sponge sheet having the stretch fabric bonded thereto is wound up on a roll which is then transferred over the second belt conveyor. The polyurethane film formed on the support (release paper) in the manner as described hereinbefore is placed on the first belt conveyor and advanced, and coated with a urethane type or chloroprene type adhesive from the adhesive-coating roll over the first belt conveyor. The adhesive-coated polyurethane film on the support is transferred onto the second belt conveyor and advanced while evaporating the solvent contained in the urethane type or chloroprene type adhesive, and covered with the sponge sheet having the stretch fabric bonded thereto which has been unwound from the roll, followed by effecting bonding under pressure in the same manner as described above. Thereafter, the resulting composite structure with the support is allowed to stand at 30° C. for 48 hours in a drying machine to completely effect the reaction of the adhesives. The support is peeled off to obtain a wet suit material.

Another type of wet suit material is prepared from a sponge sheet having a stretch fabric bonded thereto which has been prepared in the manner as described hereinbefore. Another stretch fabric is bonded to the sponge sheet having the stretch fabric bonded thereto in the same manner as described hereinbefore to obtain a sponge sheet sandwiched between the two pieces of the stretch fabrics, which is then wound up on a roll which is subsequently transferred over the second belt conveyor. Thereafter, the polyurethane film formed on the support is bonded through the stretch fabric to the sponge sheet sandwiched between said two pieces of the stretch fabrics in substantially the same manner as described hereinbefore. Subsequently, the resulting composite structure with the support is allowed to stand at 30° C. for 48 hours in a drying machine to completely effect the reaction of the adhesives. The support is peeled off to obtain a wet suit material. In this type of wet suit material, a thin stretch cloth having a better stretchability may be used on the side of the polyurethane film.

The face of the wet suit material may be made either smooth or embossed depending upon the state of the support surface.

Figure 3:
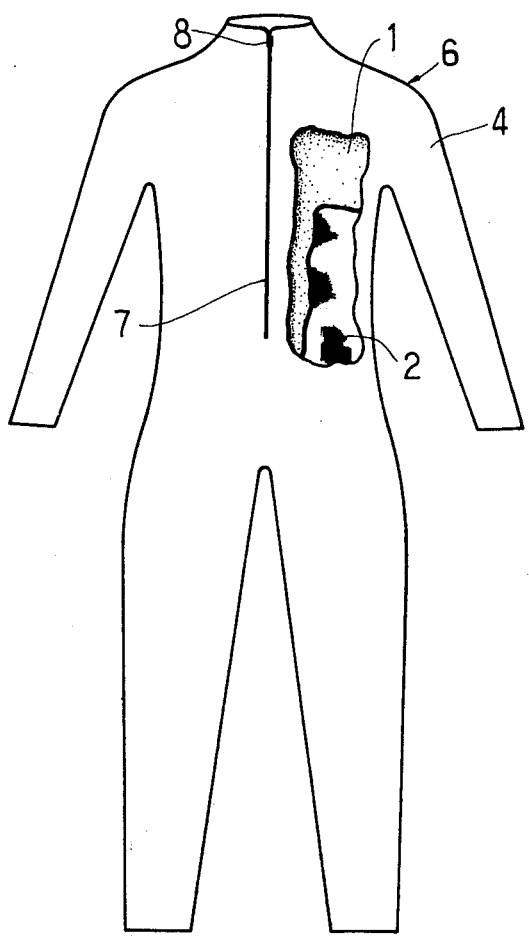
FIG. 3 is a partially broken front view of one example of the wet suit of the present invention.

According to another aspect of the present invention, there is provided a wet suit made of a wet suit material of the kind described before. FIG. 3 shows an example of the wet suit 6 of the present invention which includes a slide fastener 7 which is provided from the body to the neck of the front part of the wet suit and a slide 8 therefor.

The wet suit of the present invention can be put on a human body in the same manner as in the case of the conventional wet suits.

The wet suit of the present invention is excellent in water repellency, stretchability and heat retaining properties, and provides good workability and style when it is put on a human body. Where a white synthetic rubber sponge sheet is used in the wet suit material, a very colorful wet suit is obtained as desired.

What is claimed is:

1. A wet suit formed of a closed pore, continuous, synthetic rubber sponge sheet, a stretch fabric adhesively bonded to the interior surface of the synthetic rubber sponge sheet and a polyurethane film fixed by adhesive bonding exteriorly of the synthetic rubber sponge sheet and forming the exterior surface of the wet suit, said stretch fabric and sponge sheet and polyurethane film being substantially coextensive in area and forming a continuous laminate wherein said sponge sheet provides a substantially unbroken exterior support surface for said polyurethane film.

2. A wet suit as claimed in claim 1, which further comprises a stretch fabric adhesively bonded between the synthetic rubber sponge sheet and the polyurethane film.

3. A wet suit as claimed in claim 1 or 2, wherein the synthetic rubber sponge sheet is a white synthetic rubber sponge sheet.

4. A wet suit as claimed in claim 1 or 2, wherein the polyurethane film is a colored polyurethane film.

5. A wet suit formed of a laminate comprising a polyurethane film provided on the exterior surface of said laminate, a stretch fabric provided on the interior surface of said laminate and a synthetic rubber sponge sheet disposed between said polyurethane film and said stretch fabric.

6. A wet suit as claimed in claim 5, wherein said sponge sheet is of chloroprene rubber and said polyurethane film has a thickness in the range of 0.01 mm to 0.05 mm and said stretch fabric is of nylon.

7. A wet suit formed of a closed pore, continuous, synthetic rubber sponge sheet, said sponge sheet being of white chloroprene rubber, a nylon stretch fabric adhesively bonded with a chloroprene-type adhesive to the interior surface of said synthetic rubber sponge sheet, a polyurethane film fixed by adhesive bonding with a urethane-type or chloroprene-type adhesive exteriorly of the synthetic rubber sponge sheet and forming the exterior surface of the wet suit, said polyurethane film having a thickness in the range of 0.01 mm to 0.05 mm and being a colored polyurethane film, the brightness of which is enhanced by the white sponge sheet backing same, said stretch fabric and sponge sheet and polyurethane film being substantially coextensive in area and forming a continuous laminate wherein said sponge sheet provides a substantially unbroken exterior support surface for said polyurethane film.

8. A wet suit as claimed in claim 7 and further comprising a second stretch fabric adhesively bonded between said synthetic rubber sponge sheet and said polyurethane film, with said second stretch fabric being a thin stretch cloth having a better stretchability than said first-mentioned stretch fabric.

* * * * *